United States Patent [19]
Jacoby et al.

[11] Patent Number: 5,449,443
[45] Date of Patent: Sep. 12, 1995

[54] PHOTOCATALYTIC REACTOR WITH FLEXIBLE SUPPORTS

[76] Inventors: William A. Jacoby, 33477 Valley View Dr., Evergreen, Colo. 80439; Daniel M. Blake, 17748 W. 59th Pl., Golden, Colo. 80403

[21] Appl. No.: 258,986

[22] Filed: Jun. 13, 1994

[51] Int. Cl.⁶ .................................. C07B 63/00
[52] U.S. Cl. ...................... 204/157.3; 204/157.15; 204/158.20; 204/158.21; 588/206; 588/207; 588/210; 588/212; 588/227; 422/186.3
[58] Field of Search ............ 204/157.15, 157.3, 158.2, 204/158.21; 588/206, 207, 210, 212, 227; 422/186.3

[56] References Cited

U.S. PATENT DOCUMENTS

| | | | |
|---|---|---|---|
| 4,264,421 | 4/1981 | Bard | 204/157.1 R |
| 4,303,486 | 12/1981 | Bard | 204/162 R |
| 4,544,470 | 10/1985 | Hetrick | 204/248 |
| 4,666,478 | 5/1987 | Boissinot | 55/279 |
| 4,750,917 | 6/1988 | Fujii | 55/6 |
| 4,774,026 | 9/1988 | Kitamori | 252/627 |
| 4,788,038 | 11/1988 | Matsunaga | 422/22 |
| 4,861,484 | 8/1989 | Lichtin | 210/638 |
| 4,863,608 | 9/1989 | Kawai et al. | 210/638 |
| 4,888,101 | 12/1989 | Cooper | 204/157.15 |
| 4,892,712 | 1/1990 | Robertson | 422/186 |
| 4,943,357 | 7/1990 | Van Antwerp | 204/157.15 |
| 4,954,465 | 9/1990 | Kawashima | 502/5 |
| 4,966,665 | 10/1990 | Ibusuki et al. | 204/157.3 |
| 5,032,241 | 7/1991 | Robertson | 204/157.15 |
| 5,035,784 | 7/1991 | Anderson | 204/158.14 |
| 5,045,288 | 9/1991 | Raupp et al. | 422/186.3 |
| 5,069,885 | 12/1991 | Ritchie | 422/186 |
| 5,118,422 | 6/1992 | Cooper | 210/636 |
| 5,122,165 | 6/1992 | Wang | 55/38 |
| 5,126,111 | 6/1992 | Al-Ekabi | 422/186.3 |
| 5,137,607 | 8/1992 | Anderson | 204/59 R |
| 5,144,146 | 9/1992 | Wekhof | 250/492.1 |
| 5,152,814 | 10/1992 | Nelson | 55/270 |
| 5,174,877 | 12/1992 | Cooper | 204/193 |
| 5,225,167 | 7/1993 | Wetzel | 422/121 |

FOREIGN PATENT DOCUMENTS

| | | |
|---|---|---|
| 306301 | 3/1989 | European Pat. Off. . |
| 2243560 | 6/1991 | United Kingdom . |
| WO91/04094 | 4/1991 | WIPO . |
| WO91/09823 | 7/1991 | WIPO . |

*Primary Examiner*—John Niebling
*Assistant Examiner*—C. Delacroix-Muirheid

[57] ABSTRACT

Organic pollutants and bioaerosols in a gaseous stream are oxidized by exposure to light (e.g., UV light) in the presence of semiconductor catalyst particles or coatings supported on flexible strips suspended in the gaseous stream.

15 Claims, 3 Drawing Sheets

PHOTOCATALYTIC REACTOR WITH FLEXIBLE SUPPORTS

The United States Government has rights in this invention under Contract No. DE-AC02-83CH10093 between the United States Department of Energy and the National Renewable Energy Laboratory, a Division of the Midwest Research Institute.

BACKGROUND OF THE INVENTION

1. FIELD OF THE INVENTION

The present invention relates to techniques and processes for removing low concentrations of organic pollutants and bioaerosols from air. More particularly, this invention relates to processes for efficiently removing organic pollutants (e.g., solvent vapors) and bioaerosols from air or other gaseous streams using a photocatalyst.

2. DESCRIPTION OF THE PRIOR ART

Conventional technology is very effective in removing particles from air. However, conventional technology is not able to remove solvents such as alcohols, ketones, halogenated ethylenes, halogenated ethanes, halogenated methanes, surfactants, photoresist solvents, etc. which are used in large quantities for cleaning and other manufacturing processes in all manufacturing environments, for example, a clean room environment. In a clean room, besides being hazardous to worker's health, these chemicals are able to deposit from the air onto "clean" high energy surfaces such as ceramic substrates, semiconductor surfaces, and metal surfaces. Whenever such chemicals deposit on such surfaces, they contaminate the surfaces. This can, and often does, result in ruined materials which must be scrapped if they cannot be readily cleaned. Organic pollutants and bioaerosols also affect the health and comfort of the occupants of commercial and residential buildings.

U.S. Pat. No. 4,666,478 (Boissinot) describes scrubber apparatus for purifying air during embalming or an autopsy. The apparatus includes a housing above a work table, and an air filter comprising aluminum oxide and potassium permanganate is positioned in the housing. An ultraviolet ray tube may be included to kill germs and bacteria. No photocatalyst is described.

U.S. Pat. No. 4,863,608 (Kawai et al.) describes photocatalytic treatment of water contaminated with organic material. The water is first filtered and ultrafiltered, after which the water is irradiated with UV light in the presence of selected inorganic semiconductor and a noble metal or oxide thereof to decompose organic impurities. No Description is made of removal of solvents from air.

U.S. Pat. No. 4,750,917 (Fujii et al.) discloses techniques for cleaning air by irradiating it with UV rays to electrically charge particles in the air and then removing the particles with electrostatic filters. There is no disclosure of the use of a photocatalyst.

U.S. Pat. No. 5,152,814 (Nelson) discloses an air purifier comprising a pre-filter. Then the air is exposed to UV light and passed through a HEPA filter to kill microbes.

U.S. Pat. No. 5,225,167 (Wetzel) describes a process for sterilizing air by trapping airborne particulates in a HEPA filter. An ultraviolet lamp destroys organisms on the trapped particulates. No description is made of a photocatalyst.

U.S. Pat. No. 4,774,026 (Kitamori) describes a process for oxidizing or reducing a substance dissolved in a solution. The process involves adding a particulate semiconductor photocatalyst and a water-soluble electron acceptor or donor to the solution and irradiating it with an electromagnetic wave. There is no description of a process for removing volatile organic compounds from air.

U.S. Pat. No. 5,122,165 (Wang) describes a process for removal of volatile compounds from a liquid. The process requires a combination of pH adjustment, chemical reaction, UV reaction, gas stripping, scrubbing, adsorption and regeneration. There is no description of a process for removing contaminants from air.

U.S. Pat. No. 4,788,038 (Matsunaga) describes a process for killing cells. It does not describe a process for removing contaminants from air.

U.S. Pat. No. 4,264,421 (Bard) describes photocatalytic methods for preparing metallized powders. U.S. Pat. No. 4,303,486 (Bard) describes methods for photocatalytic decarboxylation of saturated carboxylic acids.

PCT WO 91/04094 (Raupp) describes methods employing gas-solid heterogeneous photocatalysis for treatment of groundwater and air polluted by volatile organic compounds and nonvolatile organic compounds. There is no description of efficiently removing volatile organic contaminants from air.

European Patent Application Publication No. 0306301 (Henderson) describes a purifier for water or air to remove organic pollutants.

U.S. Pat. No. 4,544,470 (Herrick) describes a photoelectrochemical structure for chemical reduction-oxidation reactions.

U.S. Pat. No. 4,861,484 (Lichtin) describes a catalytic process for controlled degradation of organic materials in a water-containing fluid at ambient temperature. There is no description of the removal of volatile organic compounds from air.

U.S. Pat. Nos. 4,888,101 and 5,118,422 (Cooper) describe a system for photocatalytically modifying a chemical composition and water purification. The system includes semiconductor powder dispersed and trapped in a layer of glass wool.

U.S. Pat. Nos. 4,892,712 and 5,032,241 (Robertson) describe a device for purifying water or air. The device includes a high surface area matrix with photoreactive metal semiconductor bonded to the matrix.

U.S. Pat. No. 4,943,357 (Van Antwerp) describes a method of photodegrading a metallic chelate complex in an aqueous solution. There is no disclosure of a method for removing organic contaminants from air.

U.S. Pat. No. 4,954,465 (Kawashima) describes photocatalytic apparatus for absorbing odors and decomposing the material.

U.S. Pat. No. 5,035,784 (Anderson) describes a process for degrading complex organic molecules by photocatalysis.

U.S. Pat. No. 5,069,885 (Ritchie) describes apparatus for purification of a fluid such as water using a photoreactive semiconductor.

U.S. Pat. No. 5,126,111 (Al-Ekabi) describes a method of removing, reducing, or detoxifying organic pollutants from water or air with a photoreactive metal semiconductor material, while simultaneously contacting the photoreactive material with a substance that accepts electrons.

U.S. Pat. No. 5,137,607 (Anderson) describes a reaction vessel for photochemical reactions. The vessel includes a light source and a counter-electrode. Provision is made for applying an electrical bias.

U.S. Pat. No. 5,144,146 (Wekhof) describes a method for destroying toxic substances using UV radiation. No description is made of a photocatalyst.

U.S. Pat. No. 5,174,877 (Cooper) describes apparatus for photocatalytic treatment of liquids. No description is made of treatment of air.

PCT Patent Publication WO 91/09823 (Lichtin) describes a photocatalytic process for controlled degradation of vaporized organic materials. The process employs solid catalyst, water vapor, and molecular oxygen.

SUMMARY OF THE INVENTION

It is an object of the invention to provide a process and apparatus for efficiently oxidizing and converting organic contaminants and bioaerosols in gaseous streams.

It is another object of the invention to provide a process and apparatus for converting organic contaminants and bioaerosols in gaseous streams using semiconductor catalyst and radiation in the wavelength range of about 175 to 500

It is yet another object of the invention to provide an efficient photocatalytic process and apparatus in which semiconductor catalyst is supported on flexible strips in a contaminated gaseous stream.

It is still another object of this invention to provide a process and apparatus wherein catalyst is secured to flexible supports and exposed to a contaminated gaseous stream and exposed to light in the above-defined range to convert organic compounds and other contaminants to innocuous byproducts.

It is another object of this invention to operate the photoreactor in series with a scrubber, to remove acidic gases from the effluent of the photocatalytic reactor.

It is another object of this invention to operate in series with an activated carbon filter to capture fugitive organic pollutants in the effluent from the photocatalytic reactor.

It is another object of this invention to operate in series with a noble metal catalyst bed to achieve the conversion of carbon monoxide in the effluent from the photocatalytic reactor to carbon dioxide.

Additional objects, advantages, and novel features of the invention shall be set forth in part in the description that follows and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the improved method may comprise photocatalytic conversion of organic compounds or other contaminants (e.g., bioaerosols) in a gaseous stream, comprising the steps of:
(a) adhering semiconductor catalyst particles to one or more flexible strips;
(b) placing the strip(s) in a gaseous stream containing the contaminants; and
(c) irradiating the gaseous stream and the flexible strips with UV light, whereby the catalyst is activated to cause oxidation of the compounds or contaminants.

The invention also comprises apparatus for carrying out the invention. The apparatus is a photoreactor comprising:
(a) blower means which includes a conduit having an inlet and an outlet for moving a gaseous stream;
(b) one or more flexible strip supports to which semiconductor photocatalyst are secured; wherein one end of each strip is secured to the outlet of the conduit; and
(c) a UV light source disposed adjacent to the conduit outlet and adapted to irradiate the strips when they are extended into a gaseous stream containing contaminants.

When the flexible strips are placed in the moving fluid stream containing the contaminants, the strips flap in the stream and that facilitates mixing of the reactants, the catalyst particles, and the photons. If the catalyst particles are adhered to the surface of the flexible supports, the quantum yield may be improved by fabricating the support strips out of UV-reflective material (e.g., metallic film), as photons not absorbed by the catalyst particles may be reflected from exposed support material to be absorbed elsewhere in the reactor. Also, the support strips could be made of radiation-transparent material. The apparatus and process of this invention are useful, for example, in controlling point source emissions of organic pollutants from machinery or industrial processes.

BRIEF DESCRIPTION OF THE DRAWINGS

The accompanying drawings, which are incorporated in and form a part of the specification, illustrate the preferred embodiments of the present invention and, with the description, explain the principles of the invention.

DETAILED DESCRIPTION OF THE DRAWINGS

The process of the invention for photocatalytic conversion of organic compounds and other contaminants (e.g., pathogenic microorganisms) in a gaseous stream involves the steps of:
(a) adhering semiconductor catalyst particles or coatings to one or more flexible strips;
(b) placing the strip(s) in a gaseous stream containing the contaminants; and
(c) irradiating the gaseous stream with UV light, whereby the catalyst is activated to cause oxidation of the contaminants.

The semiconductor catalyst which is useful herein is preferably $TiO_2$, although oxides of other transition metals (such as $SrTiO_3$, $WO_3$, ZnO, $SnO_2$, $Fe_2O_3$) may be used instead. Combinations of various semiconductor catalysts may also be used. Activity and/or selectivity of the semiconductor catalyst may be improved by depositing noble metals (e.g., platinum or gold) on the surface of the catalyst.

The particle size of the catalyst may vary, depending upon the method used to attach the catalyst to the flexible support. Dependent upon whether the particles are coated on the surface of the support or cast into the bulk of the support, the particle size may vary generally from a few microns to a few millimeters.

Figure 1:
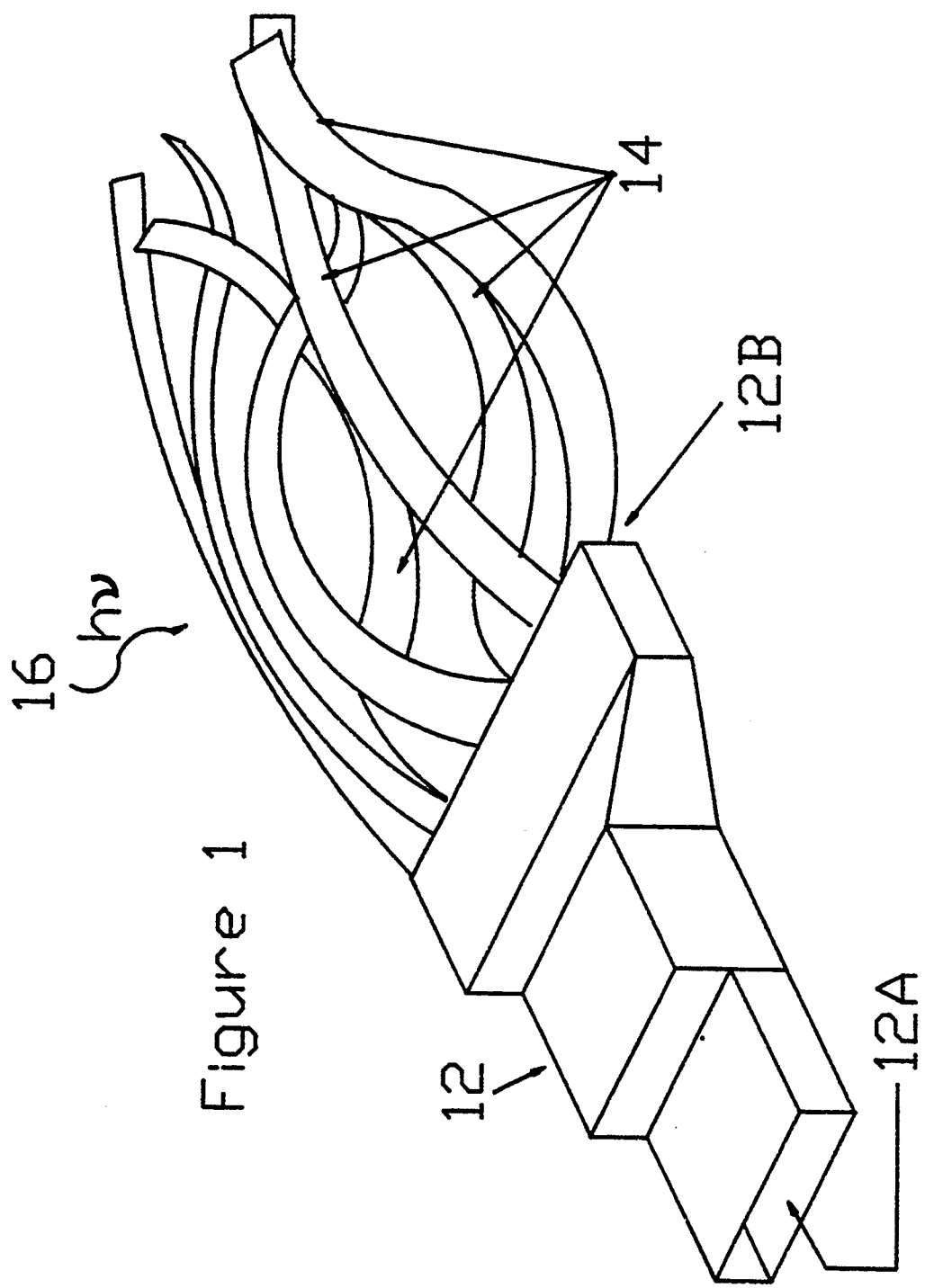
FIG. 1 is a diagram illustrating one embodiment of apparatus useful in the process of the invention.
Figure 2:
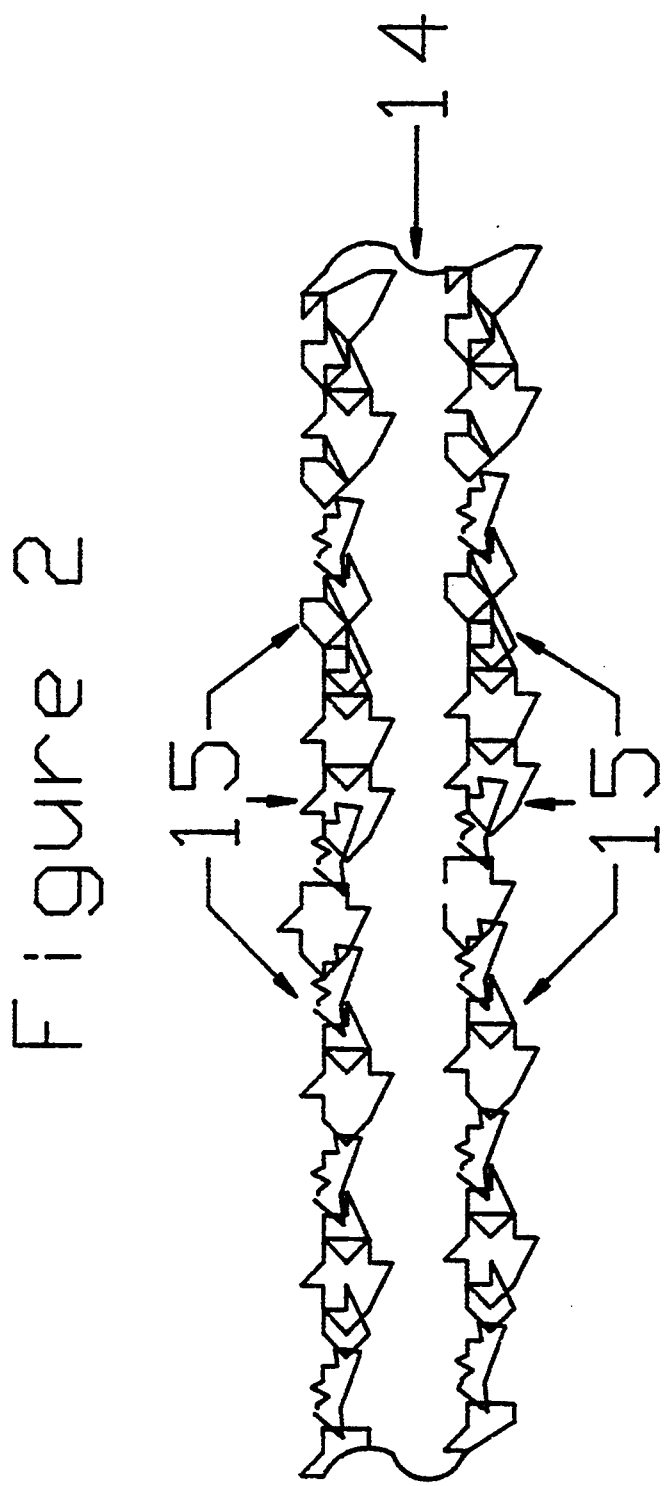
FIG. 2 shows one embodiment of a flexible strip useful in the present invention.
Figure 3:
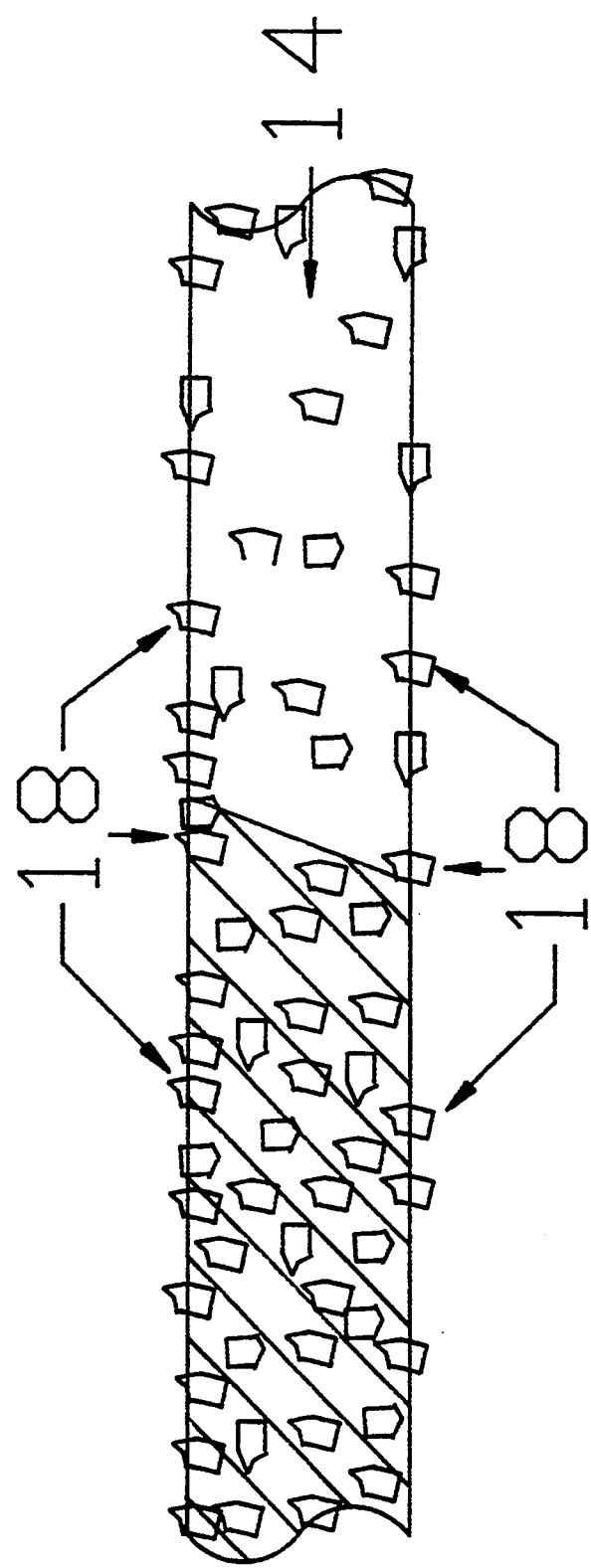
FIG. 3 shows another embodiment of a flexible strip useful in the present invention.

The catalyst may be adhered to or cast in the flexible strips. FIG. 1 illustrates one embodiment of apparatus 10 useful in this invention. The apparatus comprises a blower unit 12 having an inlet portion 12A and an outlet portion 12B. The contaminated gaseous stream passes into the inlet 12A and is forced out through outlet 12B by a fan in the blower unit. Secured to the outlet 12B are a plurality of elongated flexible strips 14 which support a plurality of photocatalyst particles. A light source 16 irradiates the gaseous stream in the presence of the flapping supports or strips 14, whereby the photocatalyst particles are activated and oxidize the contaminants in the gaseous stream. The catalyst particles 15 may be adhered to the surface of strips 14 (as shown in FIG. 2) or they may be cast into the flexible support 18 (as shown in FIG. 3). The light source may be a lamp (e.g., UV light) or sunlight having radiation in the range of 175 to 500 nm.

Effective mixing of the catalyst with the contaminated air or other gaseous stream to be treated provides the highest possible reaction rates and most efficient use of photons. The efficiency of photon use is described in terms of global quantum yield, i.e., the number of reactant molecules undergoing reaction divided by the number of photons absorbed in the reactor. This minimizes operating expenses. When the catalyst particles are cast in the matrix of the flexible strip(s), this requires that the flexible strip(s) be transparent to UV light or other light in the range of about 175 to 500 nm.

Additionally, photon absorption may occur on a much faster time scale than the subsequent chemical reaction. Therefore, a catalyst particle may move into close proximity with the light source, absorb a photon to create an electron hole pair, and then move away from the light source into a "darker" region where oxidation of an absorbed reactant can occur. This scheme also results in highly efficient use of photons and high quantum yields.

The loading of the catalyst onto (or into) the flexible catalyst strips will be such that an optimum balance between reaction rate and attrition is struck. Laboratory work puts this on the order of 10–1000 mg/cm$^2$ support strip area.

The flexible strips may be plastic (i.e., polymeric) or metallic films (e.g., aluminum) or a flexible glass or ceramic material. The catalyst particles may be wash coat applied onto the etched surface of the strips from water or alcohol solvent. The particles may also be adhered to the strips using a binder or an adhesive. They may also be applied by a vapor deposition technique to form a coating.

The useful range of widths and lengths of the support strips may vary, dependent upon the volume and linear velocity of the gaseous stream flowing through the reactor. The support strips should be sized so as to ensure that there is rapid and vigorous flapping of the strips in the reactor. This maximizes the mixing of the three components of heterogeneous photocatalysis: photons, reactants, and catalyst particles.

The contaminated air or other gaseous stream to be treated may contain one or more of various organic contaminants such as alkenes, halogenated alkenes and alkanes, aromatics, halogenated aromatics, alcohols, acetyl chlorides, ketones and aldehydes. Other types of organic contaminants and pathogenic or allergenic microorganisms may also be destroyed in the process of the invention.

The foregoing contaminants are oxidized in the present process. Accordingly, some oxygen or other oxidizing agent must be present in the gaseous stream to facilitate the oxidation reactions. Generally the gaseous stream should contain at least about 5% oxygen if maximum reaction rate is to be maintained, although lesser amounts may be serviceable, and none need be present if another oxidizing agent is used. Excess oxygen does not inhibit the reaction. Accordingly, air (about 20% oxygen) is a good medium for the gaseous reactants.

In general, the rate of a chemical reaction will be proportional to the concentration of the reactants. Therefore, the higher the concentration of the contaminant, the more efficient the operation of the photocatalytic reactor becomes. Since a high degree of destruction is normally desired for pollution remediation equipment, the size (residence time) of the reactor must be appropriate to the flow rate and composition of the feed stream. Suffice it to say that a photocatalytic reactor can destroy contaminants in air throughout a range of concentrations levels from ppb to a few percent.

The flow rate will depend on the size of the reactor and the number of photons absorbed in a reactor. A more pertinent term is residence time (void volume of the reactor divided by volumetric flow rate of the feed stream). Chlorinated alkenes require a residence time on the order of milliseconds, while other types of compounds may require seconds or minutes for complete destruction. Reactors may be sized to handle flow up to hundreds of liters per minute.

The amount of catalyst must be proportional to the flow rate and composition of the feed. Very large reactors may require kilograms of catalyst.

When the reaction is not photon limited, the rate of destruction of the contaminant will be linearly dependent upon the photon density. When excess photons are supplied, recombination of electrons and holes may occur, leading to a half order dependence of rate on photon density. Since photons are expensive relative to catalyst, an efficient photocatalytic reactor should operate in the linear range. Photon flux is controlled through the type, wattage and proximity of the UV lamps used. Time of day and geographical location will control photon flux if natural sunlight is being used.

As another variation, the gaseous stream leaving the photoreactor is passed through a caustic scrubber to remove acidic compounds or reaction products from the gaseous stream. Also, the gaseous stream could be passed through an activated carbon filter. As yet another alternative, the gaseous stream could be passed through a noble metal catalyst bed to convert carbon monoxide to carbon dioxide.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A method for photocatalytic conversion of contaminants in a gaseous stream, the method comprising the steps of:

(a) adhering semiconductor catalyst particles to one or more flexible strips;
(b) moving the strip(s) in a flowing gaseous stream containing the contaminants to mix the catalyst particles with the contaminated stream: and
(c) irradiating said gaseous stream and said moving strips and adhered catalyst particles with light having a wavelength of about 175 to 500 nm, whereby said catalyst is activated to cause oxidation of said contaminants.

2. A method in accordance with claim 1, wherein said catalyst comprises a semiconductor oxide.

3. A method in accordance with claim 2, wherein said catalyst particles further comprise a noble metal on the surface of said particles.

4. A method in accordance with claim 1, wherein said catalyst has a particle size in the range of 10 nm to 100 micrometers.

5. A method in accordance with claim 1, wherein said gaseous stream comprises air contaminated with organic compounds.

6. A method in accordance with claim 1, wherein said contaminants are selected from the group consisting of organic compounds, inorganic compounds or microbial agents.

7. A method in accordance with claim 1, wherein said light comprises UV light.

8. A method in accordance with claim 1, wherein said gaseous stream comprises a mixture of a gas and an oxidizing agent.

9. A method in accordance with claim 1, wherein said contaminants comprise hazardous organic compounds.

10. A method in accordance with claim 1, wherein said contaminants comprise pathogenic microorganisms.

11. A method in accordance with claim 1, further comprising the step of passing said gaseous stream through a scrubber, after exposure to said light, to remove acidic reaction products from said gaseous stream.

12. A method in accordance with claim 1, further comprising the step of passing said gaseous stream through an activated carbon filter, after exposure to said light, to remove fugitive emissions.

13. A method in accordance with claim 1, further comprising the step of passing said gaseous stream through a noble metal catalyst bed, after exposure to said light, to convert carbon monoxide to carbon dioxide.

14. Apparatus for oxidizing organic pollutants or bioaerosols with a semiconductor catalyst in a gaseous stream comprising:
(a) catalyst support means comprising flexible strips for supporting the semiconductor catalyst in the gaseous stream;
(b) blower means for blowing and moving the flexible strips and supported catalyst the gaseous stream: and
(c) radiation means for irradiating said gaseous stream and said strips to light in the wavelength range of about 175 to 500 nm.

15. The apparatus of claim 14 wherein the flexible strips comprise metallic film.

* * * * *

UNITED STATES PATENT AND TRADEMARK OFFICE
CERTIFICATE OF CORRECTION

PATENT NO. : 5,449,443

DATED : September 12, 1995

INVENTOR(S) : William A. Jacoby and Daniel M. Blake

It is certified that error appears in the above-identified patent and that said Letters Patent is hereby corrected as shown below:

Title page, item [73]
Add:

Assignee:  Midwest Research Institute
                  Kansas City, Mo.

Attorney, Agent or Firm--Edna M. O'Connor

Signed and Sealed this

Nineteenth Day of December, 1995

*Attest:*

BRUCE LEHMAN

*Attesting Officer*      *Commissioner of Patents and Trademarks*